Patented Feb. 10, 1942

2,272,828

UNITED STATES PATENT OFFICE 2,272,828

PRODUCTION OF POLYVINYL ACETALS

Herbert Berg, Burghausen, Oberbayern, Germany, assignor to Dr. Alexander Wacker Gesellschaft für Elektrochemische Industrie G. m. b. H., Munich, Germany, a corporation of Germany No Drawing. Application February 15, 1939, Serial No. 256,509. In Germany February 26, 1938

4 Claims. (Cl. 260—66)

This invention relates to the production of polyvinyl acetals and, more particularly, to the production of polyvinyl acetals through the condensation of aldehydes or ketones with polyvinyl alcohol or an incompletely hydrolyzed polyvinyl derivative.

The term "polyvinyl acetal" is used herein in its broader sense to include the condensation products of polyvinyl alcohol with ketones and known specifically as "ketals" and the condensation products of polyvinyl alcohol with aldehydes and known specifically as "acetals," using that term in its narrower sense.

Polyvinyl acetals have been prepared either by the so-called "two-stage" process wherein separately produced polyvinyl alcohol or an incompletely hydrolyzed polyvinyl derivative is reacted with a carbonyl compound such as an aldehyde or a ketone, or by the so-called "one-stage" process wherein a polyvinyl derivative is partially or completely saponified with simultaneous acetalization without the formation of free polyvinyl alcohol as an intermediate product.

In the two-stage process it has been found exceedingly difficult to obtain the polyvinyl acetal in the pulverulent form which facilitates the purification and subsequent treatment of the product. When the condensation reaction is carried out in an aqueous medium, the difficulty arises through the tendency of the condensate to form lumps; when using organic solvents as the reaction medium, the difficulty is due to the tendency of the product to form lumps when it is subsequently precipitated with water.

In the one-stage process the condensation products, dissolved in organic solvents, are precipitated and here again the tendency toward the formation of lumps causes great difficulty in obtaining a pulverulent precipitate.

An object of the present invention is to provide a method of producing polyvinyl acetals in the two-stage process without encountering the difficulties enumerated above. A further object is to provide a simple, economical, and practical method of preparing polyvinyl acetals in a form better adapted to the washing out of impurities and putting the product in condition for commercial use. Other objects of the invention will be apparent from the description given hereinafter.

The above objects are accomplished according to the present invention by condensing polyvinyl alcohol, or a partially hydrolyzed polyvinyl derivative, and either an aldehyde or a ketone in a highly concentrated aqueous reaction medium while subjecting the reaction mixture to a kneading action, the amount of water in the reaction mixture being such that at the end of the condensation reaction the reaction mixture is converted to a crumbly mass. By the addition of water to this crumbly mass the polyvinyl acetal is precipitated as a powder which may be readily washed free of acid catalyst with water.

The condensation reaction may be carried out in any of the usual mixing or kneading machines commonly used in the plastics art. Various blade mixers, worm mixers, roller mills, and the like, are adapted for this, the ordinary Werner-Pfleiderer mixer and the Banbury mixer being quite suitable. Since an acid catalyst is used in this condensation reaction, those parts of the mixer or kneading machine in contact with the reaction mass should be constructed of acid resisting material. Where it is desired to carry out the condensation at a higher temperature than will simply result due to the exothermic heat of reaction, the apparatus should be fitted with heating means such as a jacket. However, the reaction may be carried out advantageously at relatively low temperatures where heating of the apparatus is not necessary, the temperature to be maintained in any specific instance depending upon the reactants involved and the conditions obtaining.

The following example, wherein parts are given by weight, illustrates the specific embodiment of the invention:

*Example.*—One thousand parts of polyvinyl alcohol in a bronze kneader are made into a paste with 400 parts of a 40% aqueous formaldehyde solution and the resulting paste homogenzied while subjected to an elevated temperature. The homogeneous viscous paste is then cooled to room temperature and mixed with 72 parts by weight of concentrated sulfuric acid. The mixture is then kneaded while cold until the paste is converted into a powder. A cooled mixture of 810 partes of concentrated sulfuric acid and 400 parts of 40% aqueous formaldehyde solution is then added, the powder being converted into paste form. Further kneading is continued until the mass thickens and gradually becomes crumbly.

When the reaction mixture has become a crumbly mass 500 parts of water are slowly added causing the polyvinyl formal formed to precipitate as a powder. The precipitated powder is then washed with water until it is free of acid.

If a particularly pure white polyvinyl acetal is desired, the precipitation may be accomplished by slowly adding chlorine water.

The polyvinyl formal thus produced contains 10–12% free hydroxyl groups and is readily soluble in the customary solvents for polyvinyl acetals without leaving a residue or forming a gel.

It will be understood that the above example is merely illustrative and that the present invention is broadly applicable to the production of polyvinyl acetals generally. The condensation reaction whereby polyvinyl acetals are formed from polyvinyl alcohol and one or more aldehydes and/or ketones is well known and the present invention is not concerned specifically with the selection of the particular aldehyde or ketone used or the particular partially hydrolyzed polyvinyl derivative, or the acid catalyst, and such details which are fully known to those skilled in the art.

For example, the present invention is applicable to the condensation of aliphatic aldehydes and ketones such as acetaldehyde, propionaldehyde, butyraldehyde, crotonaldehyde, acrolein acetone, methyl ethyl ketone, methyl vinyl ketone, and the like, and also, to the condensation of aromatic aldehydes and ketones such as benzaldehyde, cinnamic acetaldehyde, and the like. Mixed polyvinyl acetals may be prepared by using different aldehydes and ketones either simultaneously or successively.

In place of free polyvinyl alcohol, partially hydrolyzed polyvinyl esters such as polyvinyl acetate may be used. In this manner a polyvinyl acetal may be obtained having various percentages of hydroxyl, acetyl, and acetal groups.

An essential part of the present invention is the use of a highly concentrated aqueous reaction medium, the amount of water being sufficiently small so that at the end of the condensation reaction a crumbly mass is obtained. The exact proportion of water used will be dependent upon the reaction components in each particular instance. For example, if trioxymethylene is used in place of formaldehyde, considerably less water is required and considerably smaller additions of acid are necessary.

The method of preparing polyvinyl acetals in accordance with this invention may be advantageously combined with the production of polyvinyl alcohols or partially hydrolyzed polyvinyl derivatives made according to the process disclosed in applicant's copending application Serial No. 206,272, filed May 5, 1938. The process of preparing polyvinyl alcohol as disclosed in said application Serial No. 206,272 comprises hydrolyzing a derivative of polyvinyl alcohol by reacting the derivative with an alcohol in the presence of a hydrolysis catalyst, the relative proportions of liquid and solid constituents in the reaction mixture being such as to form a plastic mass, and mechanically working the plastic mass in a mixing or kneading machine. The organic solvents are then distilled off, leaving the resultant polyvinyl alcohol as a powder. By combining this process with the process of the present invention, the advantage of a one-stage process is practically obtained, that is, the advantage of going in substantially one operation from a polyvinyl ester to the desired polyvinyl acetal, since the polyvinyl alcohol is precipitated in the kneading apparatus according to the process disclosed in application Serial No. 206,272 in a form which permits carrying out the further treatment according to the present invention without discharging the alcohol from the reaction apparatus.

An outstanding advantage of the present invention resides in the fact that the polyvinyl acetal is easily obtained in a pulverulent form which greatly facilitates the washing and subsequent treatment of the compound. A further advantage is that the use of expensive solvents is avoided and yet a product having an extremely uniform degree of acetalization may be readily prepared.

As many apparently widely different embodiments of this invention may be made without departing from the spirit and scope thereof, it is to be understood that the invention is not limited to the specific embodiments thereof except as defined in the appended claims.

I claim:

1. Method of producing a polyvinyl acetal in pulverulent form which comprises condensing polyvinyl alcohol and a compound from the group consisting of aldehydes and ketones, in a concentrated aqueous reaction medium in the substantial absence of organic solvents while subjecting the reaction mixture to a kneading action, the amount of water in the reaction mixture being such that at the end of the condensation reaction the reaction mixture is converted to a crumbly mass, and adding water to said crumbly mass to precipitate the condensation product in pulverulent form.

2. Method of producing a polyvinyl acetal in pulverulent form which comprises condensing polyvinyl alcohol and an aldehyde in a concentrated aqueous reaction medium in the substantial absence of organic solvents while subjecting the reaction mixture to a kneading action, the amount of water in the reaction mixture being such that at the end of the condensation reaction the reaction mixture is converted to a crumbly mass, and adding water to said crumbly mass to precipitate the condensation product in pulverulent form.

3. Method of producing a polyvinyl acetal in pulverulent form which comprises condensing polyvinyl alcohol and a ketone in a concentrated aqueous reaction medium in the substantial absence of organic solvents while subjecting the reaction mixture to a kneading action, the amount of water in the reaction mixture being such that at the end of the condensation reaction the reaction mixture is converted to a crumbly mass, and adding water to said crumbly mass to precipitate the condensation product in pulverulent form.

4. Method of producing a polyvinyl acetal in pulverulent form, which comprises reacting a derivative of polyvinyl alcohol with an alcohol in the presence of a hydrolysis catalyst, the relative proportions of liquid and solid constituents in the reaction mixture being such as to form a plastic mass, mechanically working said mass whereby polyvinyl alcohol is obtained, volatilizing organic solvents from said reaction mixture, thereafter adding to said reaction mixture a compound from the group consisting of aldehydes and ketones, and subjecting the whole in the substantial absence of organic solvents to a kneading action whereby said polyvinyl alcohol is condensed with said compound, the amount of water present being such that at the end of the condensation reaction the reaction mixture is converted to a crumbly mass, and adding water to said crumbly mass to precipitate the condensation product in pulverulent form.

HERBERT BERG.